United States Patent Office 2,889,705
Patented June 9, 1959

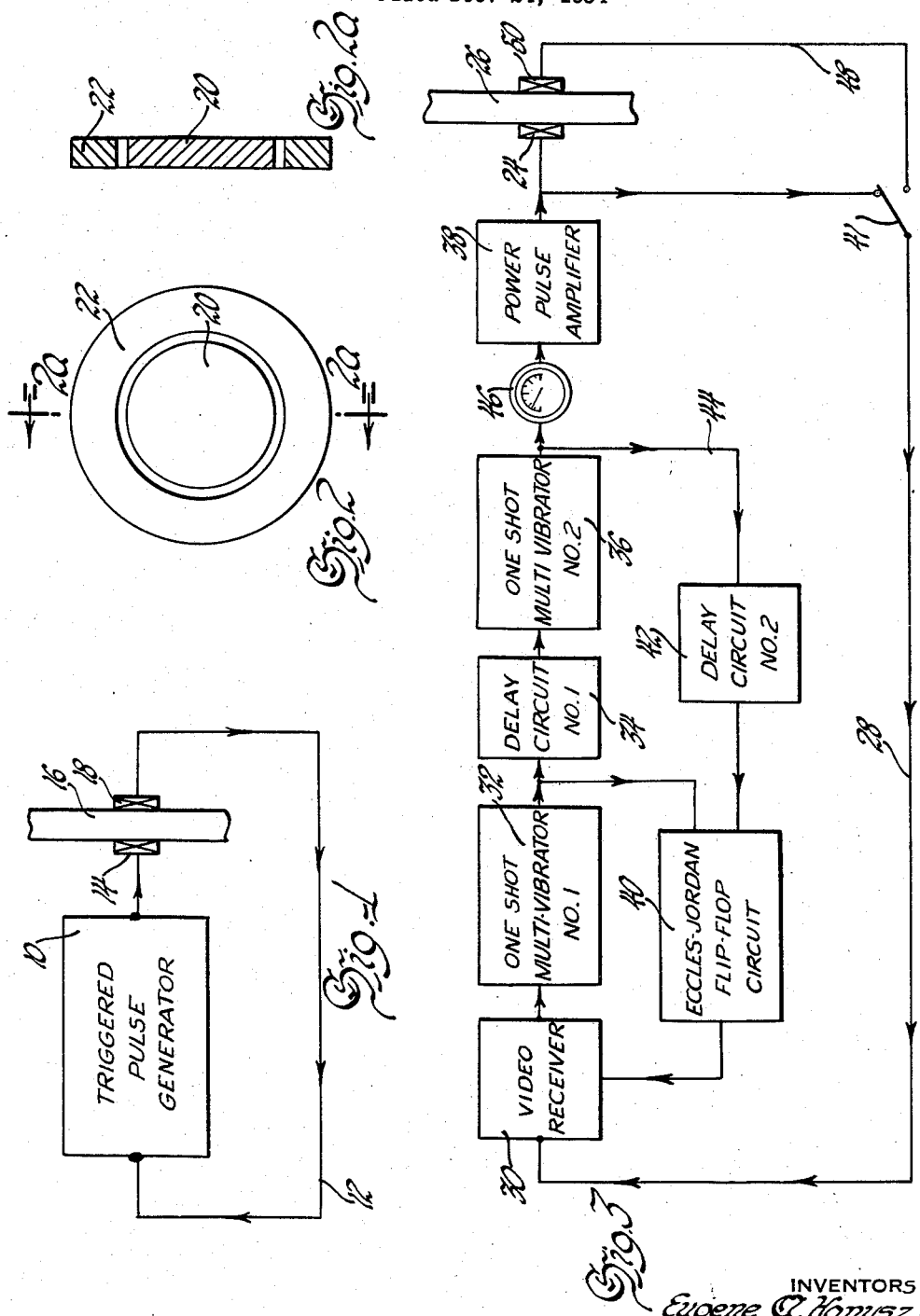

2,889,705

MATERIAL THICKNESS AND DEFLECT TESTING DEVICE

Eugene A. Hanysz, Royal Oak, and Norman W. Schubring, Hazel Park, Mich., assignors to General Motors Corporation, Detroit, Mich., a corporation of Delaware Application December 24, 1954, Serial No. 477,534

3 Claims. (Cl. 73—67.8)

This invention relates generally to means for inspecting workpieces and more particularly to means for inspecting workpieces and materials through the use of high frequency energy waves to determine material thickness, the presence of material defects, and other material characteristics.

Ultrasonic, supersonic and high frequency inspection devices have been found highly adaptable for inspecting workpieces and materials in that they do not damage or require the destruction of the object under inspection. Several methods of ultrasonic and high frequency material inspection have been proposed in the past. These methods include means for transmitting a single shock wave or pulse of energy into a workpiece and measuring the interval of time required for the wave to travel through the object. This is a single step operation requiring the initiation of another pulse for each inspection. Another method requires transmitting a continuous wave of energy through an object and measuring or detecting the variation in the amount of energy received. This method is dependent upon the composition of the material through which the wave is transmitted as well as the consistency of the material. Still another method includes transmitting energy pulses through a workpiece at prescribed spaced intervals and in measuring or comparing the intervals at which such pulses are received. Here again the composition of the material will vary the inspection results obtained. A still further method of inspection includes pulsing ultrasonic or high frequency shock waves through a workpiece at set intervals and detecting the rate of change of energy received as an indication of the presence of material defects or flaws. This latter method is adaptable for flaw detection only.

It is now proposed to provide an improved means of using high frequency shock wave energy for the inspection of workpieces and materials thereof which will allow continuous inspection independently of the composition of the material and of the actual energy loss in passing a wave or pulse through the material under inspection. It is proposed to provide a means for transmitting pulses or waves at high frequency into a workpiece and having each pulse as it emerges from the workpiece initiate or trigger the succeeding pulse. Since the time required for a shock wave or pulse to travel through a workpiece is a function of the velocity of sound through the material and of the length of the sonic path, the rate of pulse repetition, each pulse being triggered by the next preceding pulse, is directly proportional to the velocity of sound through the workpiece material and inversely proportional to the length of the sonic path through the workpiece. It is therefore proposed to calibrate an instrument adapted to indicate the rate of pulse repetition in units of sonic path length for measuring the thickness of the material under inspection. The proposed device is also adapted for flaw detection since any flaws or defects within the material under inspection will vary the rate of pulse repetition and provide an indication of such defect.

In the drawing:

Figure 1 is a block diagram representing a method of injecting shock waves consecutively into a workpiece upon the emerging of a previous wave therefrom.

Figures 2 and 2a are plan and cross-sectional views, respectively, of a concentric input and pick-up transducer which may be mounted upon one side of a work surface and adapted to transmit and receive wave pulses with respect thereto.

Figure 3 is a block diagram showing a means of inspecting a workpiece by use of the proposed invention and from one side thereof.

A simplified means of injecting shock waves into a member to be inspected and of using the wave emerging therethrough to initiate the next succeeding shock wave is shown in Figure 1.

A triggered pulse generator 10, such as is shown and described in the textbook "Theory and Application of Electron Tubes" by Reich, McGraw-Hill Publishing Company, 1944, page 360 and Figures 10–16, is connected by suitable circuitry 12 to an input transducer 14 at the outer face of a work member 16 to be inspected and to a pick-up transducer 18 at the inner face of the work member. The input and pick-up transducers 14 and 18 are preferably such as are shown and described in the textbook "Ultrasonics" by Carlin, McGraw-Hill, 1949, page 85 and Figure 4–4.

A shock wave emerging from the work member 16 at the inner face thereof is received by the pick-up transducer 18 and is converted thereby into an electrical pulse. This electrical pulse is transmitted through the circuitry 12 to the pulse generator 10, triggering the generator which then generates a large electrical pulse and applies it to the input transducer 14. The input transducer 14 converts the electrical pulse into a mechanical impulse and a shock wave is thereby injected into the work member 16. The closed circuit shown will then oscillate and the frequency of oscillation will be determined by the composition of the work member 16 and by the length of the sonic path therethrough. The work member 16 of Figure 1 will be oscillated at twice its natural resonant frequency.

In certain instances it may be impractical or impossible to position a pick-up transducer at the inner face of a work member which it is desired to inspect. Under such circumstances it is proposed to provide input and pick-up transducers, which may be placed side by side on the exposed surface of the work member. In Figures 2 and 2a there is shown a pair of complementary piezoelectric crystals 20 and 22 concentrically arranged and mounted as a single probe with the input transducer crystal 20 centrally located within the pick-up transducer crystal 22. In using the single probe transducer in the circuitry 12 of Figure 1, the probe being disposed in the position of input transducer 14, the shock wave from the input transducer 20 is transmitted through the work member 16, reflected from the opposite side thereof, and is returned through the work member to the pick-up transducer 22. The reflected energy wave will arrive in phase with the input energy wave and will, in this instance, reinforce the input wave causing the work member 16 to vibrate at its natural resonant frequency. The single probe arrangement thus eliminates the danger of false indications due to objectionable multiple resonance responses.

A work member may also be inspected from one side thereof with only one transducer adapted to fulfill both the input and pick-up transducer functions. Such an adaptation is shown as a part of Figure 3.

A transducer 24 is disposed at the outer face of a work member 26 and is connected through circuitry 28 to a video receiver 30, multivibrator 32, delay circuit 34, another multivibrator 36 and a power pulse amplifier 38, each connected to the other in the respective order given. With the circuit switch 41 in the position shown, a shock wave emerging from the work member 26 causes the transducer 24 to generate an electrical pulse. The pulse is transmitted through the switch 41 to the video receiver 30. The video receiver 30 is preferably of the type shown and described in the textbook "Microwave Receivers" by Van Voorhis, McGraw-Hill, 1948, page 534 and Figure 19–22. The video receiver 30 amplifies the electrical pulse and triggers the one-shot multivibrator 32. Both of the multivibrators 32 and 36 are essentially similar to the triggered pulse generator 10 mentioned previously. The wave form or shape of the pulse obtained from the multivibrator 32 is a steep wave front type which permits an accurate delaying of the signal by the delay circuit 34. The delay circuit 34 is such as is shown and described in the textbook "Electronic Time Measurement" by Chance, Hulsizer, MacNichol and Williams, McGraw-Hill, 1949, page 131, Figure 5–14.

Following the delay imparted to the pulse signal in the delay circuit 34, the pulse triggers the multivibrator 36 which sends out a signal to the power pulse amplifier 38. A preferable type of power pulse amplifier is shown and described in the McGraw-Hill textbook "Vacuum Tube Amplifiers" by Valley and Wallman, 1948, page 144, Figure 3–29. The transducer 24, upon receipt of the signal from the power pulse amplifier 38, generates a mechanical impulse which sends another shock wave into the work member 26 where it traverses the work member, reflects off the opposite side thereof, and returns to the transducer to begin again the recurrent cycle.

The operating electrical pulse generated by the multivibrator 32 passes through delay circuit 34, triggers a second multivibrator 36 whose electrical output pulse further passes through a meter 46, amplifier 38, and is then applied to the transducer 24 where it is converted into a mechanical pulse which is applied to the work member. The reflection of the mechanical wave from the opposite side of the work member sets up vibrations in the transducer and creates an electrical pulse. This last named pulse is fed back through line 28 to apply a trigger voltage to the video receiver to initiate the next pulse to be transmitted into the part. Means are provided to deactivate the video receiver after it has triggered one pulse until that pulse has traversed the path just outlined and has been reflected in the part to the receiving transducer at which time the video receiver is reactivated so that this reflected pulse may trigger the next pulse from the multivibrator 32. In order to deactivate the video receiver 30 as mentioned, and prevent any premature re-triggering of the cycle until the proper point, the video receiver is gated out by an Eccles-Jordan flip-flop circuit gate 40, by the driving pulse obtained from the output of the multivibrator 32. This pulse is fed to the Eccles-Jordan flip-flop circuit which deactivates the video receiver and simultaneously passes on through delay circuit 34 to eventually be applied to the part. The delay circuit 34, however, is provided to retard or hold back the pulse until the circuit gate 40 has cut off the video receiver so that the same will be deenergized when the power driving pulse is applied to the transducer. The flip-flop circuit 40 is such as is shown and described in the textbook "Theory and Application of Electron Tubes" by Reich, mentioned previously, on page 353 and by Figure 10–5. The Eccles-Jordan flip-flop circuit gate 40 is connected to the video receiver 30, between the multivibrator 32 and delay circuit 34 and between the multivibrator 36 and power pulse amplifier 38. The driving signal from the one-shot multivibrator 32, therefore, cuts off the video receiver 30. It is necessary to keep this video receiver cut off until the driving pulse has been applied to the transducer 24 and to then reactivate it so that it is ready for the reflected signal from the part applied to transducer 24. In this case the circuit gate 40 is switched back by a signal from the multivibrator 36 through a delay circuit 42 in the connection 44 between the output of the multivibrator 36 and the circuit gate 40. The arrival of such signal reactivates the video receiver. The time delay introduced by delay circuit 42 is sufficient to prevent reactivation of the video receiver until the driving pulse has been applied to the transducer 24.

The output of the multivibrator 36 will be a constant amplitude rectangular pulse at a repetition rate determined by the length of the sonic path through the work member 26. A meter 46 is mounted between the multivibrator 36 and the power pulse amplifier 38 to read the average output of the multivibrator 36 as an indication of the pulse repetition rate and is calibrated in units of sonic path length so that the reading obtained may be correlated to obtain thickness measurements for any given material in accordance with the known velocity of sound through such material.

Where separate input and pick-up transducers may be used, a separate circuit 48 with a pick-up transducer 50 may be adapted to the circuitry 28 of Figure 3 and the switch 41 adapted to connect the transducer therein. With this latter arrangement the sensitivity control of the video receiver 30 should be adjusted to the minimum setting at which oscillations are sustained to reduce the chance of lower amplitude shock waves in the work member 26, which may follow longer or multiple paths, being adequate to trigger the system at random rates. The delay time inherent in the delay circuit 34 should also be sufficiently large to assure complete dying out of all multiple reflections before a new cycle is initiated. However, it is advisable to keep the ratio of work member delay time to multivibrator delay time as large as possible to obtain the highest accuracy of measurement.

We claim:

1. A device for inspecting work members which includes a transducer adapted to be disposed against the surface of a work member for transmitting a mechanical impulse into said work member and for receiving an impulse reflected back thereto, said transducer converting said reflected impulse into an electrical pulse, a multivibrator connected to said transducer for receiving said electrical pulses and adapted to be triggered by said electrical pulse for initiating a single steep wave front pulse, a second multivibrator producing square wave pulses connected to said first-mentioned multivibrator, means connected between said multivibrators for momentarily delaying the transmission of said wave pulse therebetween to provide time to deenergize said first mentioned multivibrator, said second multivibrator receiving said delayed wave pulse and being adapted to be triggered thereby to initiate a single wave signal, said transducer being connected to said second multivibrator for receiving said wave signal and for converting said signal into a mechanical impulse and for applying said impulse into said work member, means connected between the outlet side of said second multivibrator and the inlet side of said first-mentioned multivibrator for preventing said first-mentioned multivibrator from receiving said wave signal, and means connected between said second multivibrator and said transducer for measuring the repetitious rate of wave initiation by said second multivibrator as an indication of the sonic path length through said work member and the presence of defects and flaws therein.

2. A device for inspecting work members which includes a transducer adapted to be disposed against the surface of a work member for transmitting a mechanical impulse into said work member and for receiving an impulse reflected back thereto, said transducer converting said reflected impulse into an electrical pulse, means connected to said transducer for receiving and amplifying said electrical pulse, a one-shot multivibrator connected to said last-mentioned means for receiving the amplified electrical pulse emitted therefrom and adapted to be triggered by said amplified electrical pulse to initiate a single steep wave front pulse, a second one-shot multivibrator producing square wave pulses connected to said first-mentioned multivibrator, means connected between said multivibrators for momentrily delaying the transmission of said wave pulse therebetween to provide time to deenergize said means for receiving and amplifying said electrical pulse, said second multivibrator receiving said delayed wave pulse and being triggered thereby to initiate a single wave signal, means connected to said second multivibrator for receiving and amplifying said wave signal and connected to said transducer for transmitting the amplified wave signal thereto, said transducer converting said amplified wave signal into a mechanical impulse and applying said impulse to said work member, means connected between the outlet side of said second multivibrator and the inlet side of said first-mentioned multivibrator for preventing the triggering of said first-mentioned multivibrator upon receipt of a wave signal from said second multivibrator, and means connected between said second multivibrator and said transducer for measuring the repetitions rate of wave initiation by said second multivibrator as an indication of the length of the sonic path through said work member and the presence of defects and flaws therein.

3. A device for inspecting work members, said device including a transducer adapted to be disposed against the surface of a work member for receiving a mechanical impulse therefrom and for converting said impulse into an electrical pulse, a video receiver connected to said transducer for receiving and amplifying the electrical pulse received from said transducer, a one-shot multivibrator connected to said video receiver for receiving the amplified electrical pulse emitted from said receiver and adapted to be triggered thereby to initiate a single steep wave front pulse, a delay circuit connected to said multivibrator for receiving said wave pulse and for delaying the transmission thereof for a given interval of time to provide time to deenergize the video receiver, a second one-shot multivibrator producing square wave pulses connected to said delay circuit for receiving said wave pulse and adapted to be triggered thereby to initiate a wave signal, an amplifier connected to said second multivibrator for receiving and amplifying said wave signal, said amplifier being connected to said transducer and being adapted to transmit the amplified wave signal thereto, a circuit gate connected between the outlet sides of each of said multivibrators and said video receiver and a delay circuit connected between the outlet side of said second multivibrator and said circuit gate for preventing the permature triggering of said first-mentioned multivibrator upon receipt of an amplified wave signal from said amplifier, and means connected to said second multivibrator for measuring the repetitious rate of wave initiation by said second multivibrator as an indication of the length of the sonic path through said work member and the presence of defects or flaws in the walls thereof.

References Cited in the file of this patent

UNITED STATES PATENTS

| | | |
|---|---|---|
| 2,333,688 | Shepard | Nov. 9, 1943 |
| 2,458,288 | Moriarty | Jan. 4, 1949 |
| 2,756,404 | Anderson et al. | July 24, 1956 |

FOREIGN PATENTS

| | | |
|---|---|---|
| 881,644 | France | Jan. 28, 1943 |